United States Patent

[11] 3,540,757

[72] Inventor Martin Duane Neher
        Burkburnett, Texas
[21] Appl. No. 709,427
[22] Filed Feb. 29, 1968
[45] Patented Nov. 17, 1970
[73] Assignee Ciba Corporation
        Summit, New Jersey
        a corporation of Delaware. by mesne assignments

[54] PIPE JOINT AND METHOD OF FORMING A PIPE JOINT
    13 Claims, 8 Drawing Figs.
[52] U.S. Cl. .................................................. 285/21,
    285/289, 285/291, 285/332, 285/355; 138/96,
    138/109; 264/275, 264/300
[51] Int. Cl. ..................................................... F16l 13/02,
    F16l 33/18
[50] Field of Search ......................................... 285/291,
    21, 289, 423Inq, 355, 390, 92, 332, 290, 260;
    130/109, 96; 264/275, 300, 334, 338; 18/34

[56] References Cited
        UNITED STATES PATENTS
1,277,977  9/1918  Mann ........................... 285/289

| | | | |
|---|---|---|---|
| 1,998,633 | 4/1935 | Nichols ........................ | 285/260X |
| 2,943,967 | 7/1960 | Simon .......................... | 285/423X |
| 2,986,411 | 5/1961 | Anderson ..................... | 285/291 |
| 2,998,269 | 8/1961 | Houghton..................... | 285/260 |
| 3,224,795 | 12/1965 | Conley ........................ | 285/423X |
| 3,295,870 | 1/1967 | Seablom ...................... | 285/423X |
| 3,381,716 | 5/1968 | Michael........................ | 285/423 |

FOREIGN PATENTS 7,498    1893    Great Britain................ 285/291

Primary Examiner—Dave W. Arola
Attorneys—Harry Goldsmith, Joseph G. Kolodny, Bryant W. Brennan and Edward J. Sites ABSTRACT: A new method of joining pipe, especially thin wall plastic pipe, is provided. In this method a thread is molded onto the outer surface of the pipe at a predetermined length from the end of the pipe. Mating fittings are provided which have mating internal threads and which are adapted to receive the predetermined length of pipe in a mating relationship when said threads are engaged. The pipe joint is formed by applying an adhesive, preferably a thermal-setting resin, to the predetermined length of pipe and screwing the pipe into the fitting. The threads on the pipe and fitting hold the pipe and fitting in the proper mating position until a bond is formed between the pipe and the fitting by the adhesive.

3,540,757

PIPE JOINT AND METHOD OF FORMING A PIPE JOINT

BACKGROUND OF THE INVENTION

This invention relates to an improved method for forming pipe joints and is more particularly concerned with a method of joining thin wall plastic pipe in proper alignment without substantially reducing the strength of the pipe.

There are various methods which can be employed to make pipe joints. One of the more widely used methods is to cut threads into the outer wall of the pipe and then make the joint by screwing the threads into a fitting having mating internal threads. Another common method to make pipe joints is to bond the pipe and pipe fitting together. This may be done by using solder, as in the case of copper pipes, or by the use of resinous adhesives, as when joining plastic pipes.

The methods heretofore employed had several disadvantages, especially when joining thin wall pipe. Initially it should noted that in order to have a satisfactory joint using threads, the threads must be of a sufficient depth so that a strong joint will be formed. When a deep thread is cut into the wall of a pipe, the strength of the pipe is somewhat reduced. Of even more importance, if the walls are relatively thin, there may not be a sufficient thickness to provide a thread having a sufficient depth to make a strong joint.

For the above reasons, among others, threaded joints are not generally used to join thin walled pipe, but rather the joints are generally made by bonding an elongated end portion of the outer wall of the pipe to a mating portion of a suitable fitting with a bonding agent. This method, however, has not proven to be completely satisfactory. Most bonding agents when applied are in a liquid state. In the liquid state they are not only poor adhesives, but they may also act as lubricants which can cause the joints to slide apart. Furthermore, using the adhesive method of joining, considerable difficulty is encountered in accurately aligning the fitting and the pipe and keeping the joint in alignment during the time when the adhesive sets.

In recent years there has been a substantial increase in the use of plastic pipes in industrial applications. Typical of the industries in which a plastic pipe is being extensively used is the oil industry. The pipe generally employed in this industry is of the laminated fiberglass reinforced epoxy type. Pipe of this type is strong and light in weight and is resistant to most chemicals and other types of damage.

When installing pipe systems it is preferable to install the pipe in a more or less continuous process, moving from joint to joint. It is somewhat impractical to wait until each joint has fully set because of the time involved. It is also impractical to continue making the joints and then doubling back to check to see if all of the joint previously made set in the proper position. It is especially advantageous to join the pipe in a continuous manner when installing underground pipe systems, for example, as in an oil field. The trench for the pipe is dug and the pipe is joined and laid in the trench. It would be highly desirable to immediately backfill the trench and continue the operation. However, using the prior art adhesive methods of joining the pipe, this was not a safe procedure. The bonding agent, as noted above, not only failed to lock the joints in place, but could, in fact, act as a lubricant to cause the joint to come apart before the adhesive set. The inherent movements of the pipe during installation tended to make the pipe come apart. In addition, backfilling of the dirt into the trenches also tended to cause the joints to come apart. Even if the pipe did not come completely apart, there was a strong tendency for the joints to become misaligned. This had the effect of restricting the flow through the pipe and weakening the joint.

The use of fast curing adhesives was suggested to overcome the above problems. However, this did not prove to be satisfactory in that the relatively short pot life of these adhesives made them impractical for use in commercial applications. In addition, the extremely fast cures were not desirable in that they complicated the installation of the pipe since minor changes in the alignment of the fittings shortly after installation could not be made without destroying the joint since the adhesive cured so fast. It is well known that it is of great advantage to have a small amount of play in the pipe joints for a while after the pipe is initially installed so as to be able to compensate for certain minor difficulties which may be encountered in the installation of the pipes. Accordingly, it is one of the objects of this invention to overcome the aforementioned problems and disadvantages of the prior art.

It is an additional object of this invention to provide an improved method for forming strong, properly aligned pipe joints.

It is a still further object of this invention to provide a method for joining thin wall plastic pipe in which the pipe and fittings are held in proper alignment until the bonding agents sets.

Other objects and advantages of this invention will become further apparent hereinafter and in the drawings in which.

Figure 1:
FIG. 1 is a partial cross-sectional illustration of an end portion of a length of pipe.

In describing the preferred embodiments of the invention illustrated in the drawings, specific terminology will be resorted to for the sake of clarity. However, it is not intended to be limited to the specific terms so selected, and it is to be understood that each specific term includes all technical equivalents which act in a similar manner to accomplish a similar purpose.

Turning now to the specific embodiments of this invention selected for illustration in the drawings, the number 10 denotes an end of a length of pipe on the end of which a taper 12 has been cut. The pipe 10 may be made of any of the usual materials employed in the manufacture of pipes. However, the present invention is especially useful when the pipe is made of a plastic, for example, fiberglass reinforced epoxy. The taper 12 is not an essential feature of the present invention. However, it is of considerable advantage to cut a slight taper on the end of the pipe.

The pipe joint of the present invention is held together with a bonding agent. In order to insure that a strong bond is formed between the pipe and the fittings, the surface of the pipe to which the bonding agent is to be applied should be abraded to provide a roughened surface. This is especially true when using a plastic pipe, which has a smooth, glossy outer surface. The cutting of a taper on the pipe, in addition to making it easier to assemble the pipe and making tighter joints, also abrades the surface of the pipe to which the bonding agent will be applied. The degree of taper need not be large, with tapers of 1 to 2° being quite satisfactory.

The length of the pipe which is prepared to receive the adhesive can be varied over wide limits, depending on the size of the pipe. In practice it has been found that the length of pipe which is prepared for the adhesive should be between 1 and 2 times the diameter of the pipe in order to insure a strong joint.

A male thread 14 is molded onto the outer surface of the pipe 10. The thread 14 may be molded onto the the pipe in any of the conventional manners. The thread 14 is positioned behind the portion of the pipe to which the bonding agent will be applied.

Figure 2:
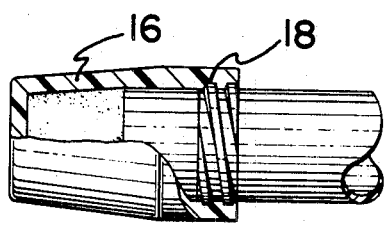
FIG. 2 is a partial cross-sectional illustration of the pipe shown in FIG. 1 having an end cap.
Figure 5:
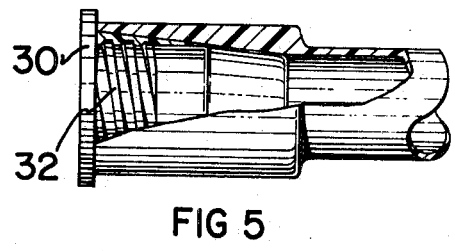
FIG. 5 is a partial cross-sectional illustration of the pipe shown in FIG. 4 having a plug inserted in the bell portion.
Figure 3:
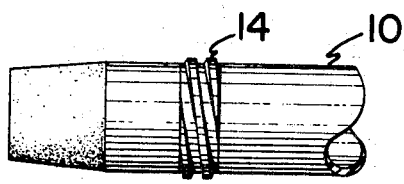
FIG. 3 is a partial cross-sectional illustration of the pipe shown in FIG. 1 having an external thread.
Figure 6:
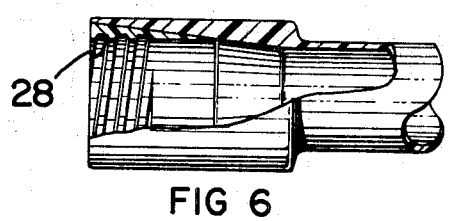
FIG. 6 is a partial cross-sectional illustration of the pipe shown in FIG. 4 having an internal thread in the bell portion.

It has been found that one of the simplest and most economical methods for molding the thread 14 onto the pipe 10 is to adhere the cap 16 to the end of the pipe with a hardenable material. Pipe is generally supplied in given lengths from the factory. A cap is applied to the ends of the pipe to protect the ends of the pipe from damage during shipment. The cap which is illustrated in FIG. 2 has internal threads 18 near its open end and has an internal configuration substantially mating the outer configuration of the pipe 10. The cap may be secured to the end of the pipe 10 and the thread 18 molded onto the pipe simultaneously by applying an amount of a hardenable material such as an epoxy resin which will fill the thread portion 18 of the cap 16. The cap 16 with the hardenable material is then slipped onto the end of the pipe 10 and the hardenable material is allowed to harden and take the shape of the thread 18. The cap 16 should be made of either a material to which the hardenable material will not adhere, for example, polyethylene or polypropylene, or should have a release coating on its inner surface, for example, a silicone coating. The hardenable material should cure fairly quickly and must adhere selectively to the surface of the pipe but not to the cap.

It can be seen that, once the adhesive hardens and takes the shape of the threads 18 of the cap 16, the cap is held onto the end of the pipe by the thread 14 which is attached to the surface of the pipe 10. The cap 16 can be readily removed before assembly of the joint to expose the end of the pipe prepared for the adhesive and the external thread 14 which is molded onto the surface of the pipe.

Figure 4:
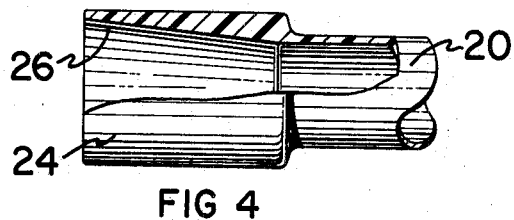
FIG. 4 is a partial cross-sectional illustration of the bell on the end of a length of pipe.

When a length of pipe 20 is to be supplied with a bell 24 at its end, the bell 24 may be formed simultaneously with the pipe 20 as shown in FIG. 4, or the bell may be formed separately and then attached to the end of the pipe.

The inner wall 26 of the bell 24 has a configuration which substantially mates with the outer wall of the end of the pipe 10. The angle of taper of the inner wall 26 is substantially the same as the angle of the taper 12 cut on the end of the pipe 10. If a taper were not cut on the end of the pipe, the inner wall 26 of the bell would likewise be untapered mating the end of the pipe. The length of the bell taper is somewhat longer than the length of the taper on the pipe since the threads 28 will be molded onto the end portion of the bell 24. The threads 28 may be formed in a manner similar to the method employed to form the threads 18. A plug 30 having male threads 32 cut into its surface is coated with a hardenable material such as an epoxy resin in an amount sufficient to fill the space between the wall 26 of the bell 24 and the plug 30, and then the plug 30 is inserted into the bell 26 and the hardenable material is allowed to harden. The threads 28 are thus molded between the plug 30 and the wall of the bell 24. The plug 30 should be made of a self-releasing material similar to the material used to make the cap 16. The plug 30 is removed to expose the female thread 28. The threads 14 and 28 and the shape of the exterior of the pipe 10 and the interior of the bell 24 are of a substantially mating configuration.

It should be noted at this point that the present invention is not limited to bell and spigot joints but can be used to make other types of joints using other types of fittings such as tee's, L's, Y's, 45's and sockets. These joints can be formed in a similar manner to the bell and spigot joint if the fittings have female threads and internal configurations which mate the male threads and exterior configurations of the pipe to which they are to be jointed.

In addition, it should be noted that it may be of some advantage in making fittings, and even when making lengths of pipe with bells, to mold the threads directly to the wall of the fitting during manufacture rather than using the plug method described above to obtain the threads.

Figure 7:
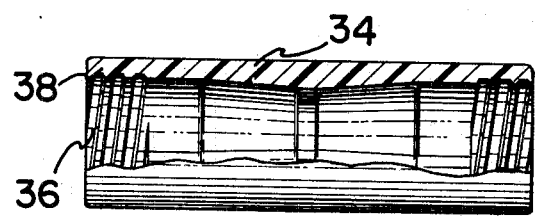
FIG. 7 is a partial cross-sectional illustration of a pipefitting suitable for employment in the present invention.

In FIG. 7 there is shown a socket 34 which has been molded with the threads 36 which have been formed directly into the walls 38 of the socket 34. This method is especially useful in the manufacture of fittings if the fittings are formed over shaped mandrels since this method does not significantly increase the cost of forming the fittings.

Figure 8:
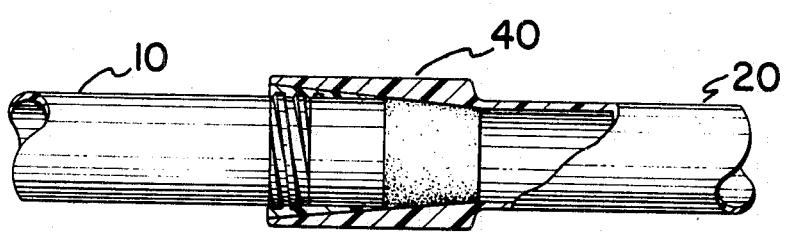
FIG. 8 is a partial cross-sectional illustration of the bell and spigot joint formed according to the method of the present invention.

The method of forming the pipe joint of the present invention is quite simple. The protective caps 16 and plugs 30, if any, are removed by screwing them off. The bonding agent, for example, an epoxy resin, is applied to the length of pipe which has been previously prepared for the adhesive. In the case of pipes having a taper 12, the bonding agent is applied to the taper. The bonding agent may also advantageously be applied to the whole length of pipe from the terminal end of the pipe to the start of the molded threads. The pipe 10 with the bonding agent applied is inserted into the bell 24 and the threads 14 and 28 are engaged and screwed together. As the male and female portions are screwed together, the joint is simultaneously aligned and then held in proper alignment during the time in which the bonding agent cures by the threads 14 and 18. In FIG. 8 a bell and spigot joint 40 is shown. However, it is to be understood that the present invention is not limited to bell and spigot joints, but includes all pipe joints formed in a similar manner. A bond is formed between the pipe and the fitting when the bonding agent cures, and it is this bond which seals and holds the pipes together in actual use.

The advantages of the present invention are many. One is that the threads 14 and 18 hold the pipe in proper alignment during mating and prevent the ends from slipping about before the bonding agent sets. This permits the continuous installation of pipe systems, including backfilling of trenches before the pipe joints have completely set, since the joints will not come apart during normal installation conditions due to the presence of the locking threads. In addition, it is important to note that the process of the present invention is especially useful for joining thin wall pipes. The threads are molded onto the pipe, not cut into the walls of the pipe. The depth of the thread necessary to hold the pipe joints together during the setting of the bonding agent is obtained without reducing the strength of the pipe, and in fact, the molded threads may even slightly increase the wall strength of the pipe near the joint. The simplicity of forming the threads by applying a protective cap 16 having threads cut into its surface along with an adhesive which will harden to form the threads in a substantial advantage in manufacturing processes since the thread is readily formed in this manner and the protective caps or plugs are then held securely in place and protect the pipe until they are removed immediately before installation of the pipe.

It is to be understood that the forms of the invention herewithin shown and described are to be taken as preferred embodiments. Various changes may be made in the shape, size and arrangement of the parts. For example, equivalent elements may be substituted for those illustrated and described herein, parts may be reversed and certain features of the invention may be utilized independently of the use of other features or without departing from the scope or spirit of the invention as defined in the subjoined claims. For example, the shape of the threads can readily be changed. In addition, in place of threads locking lugs may likewise be employed, and other such expedients which operate in a similar manner to accomplish a similar purpose without departing from the scope of the present invention.

It should be further noted that, while the use of the cap 16 and the plug 30 to mold respectively the threads 14 and 28 is the preferred method, other molding means can also be employed to form the threads. For example, to form the male thread on the outer wall of the pipe, an annular mold can be provided having an inner wall configuration substantially mating the outer wall of the pipe and having a female thread defined in the inner wall thereof. This female thread can then be filled with a hardenable material which is selectively adhesive to the wall of the pipe when in the hardened condition. The molding means, that is, the annular mold with the hardenable material in the female threads, is then slipped over the end of the pipe and positioned on the pipe at said predetermined length from the end of the pipe, and the hardenable material is allowed to harden and adhere to the surface of the pipe, whereupon the annular mold is removed and may be used over to form additional threads on other lengths of pipe.

A similar means can be employed to form the female thread in the fittings. A mold member is provided which has an exterior configuration substantially mating the interior configuration of the fitting and having defined on its outer walls thereof a male thread. The male thread portion is filled with a hardenable material which is selectively adhesive to the material comprising the fitting, and the mold member is inserted into the fitting. The hardenable material is allowed to harden in place, whereupon the hardenable material selectively adheres to the fitting and takes the form of the male thread of the mold member. The mold member may then be removed and used to make additional female threads in other fittings.

Further it should noted that, while the present invention is especially well suited for permanent pipe installations wherein the joints are permanently bonded together with a thermal setting adhesive such as an epoxy resin, the present invention can also advantageously be employed in temporary pipe installations such as temporary lines for drilling water, irrigation water, etc. For temporary installations it is preferable to taper the ends of the pipe so that a relatively tight joint will be formed when the pipe and fitting are assembled. A further advantage of using the tapered ends with thin wall pipe is that the internal pressure of the liquid passing through the pipe will tend to force the relatively flexible tapered ends into sealing contact with the fitting. In temporary installations a non-hardening sealer such as pipe dope is employed as the bonding agent. The pipe joint is assembled as noted above with the exception that the pipe dope is used in place of the thermal setting resinous adhesive. The pipe joint can be disassembled by simply screwing the joint apart and thereby breaking the seal of the pipe dope between the end of the pipe and the fitting.

I claim:

1. In the method of making a pipe joint wherein an elongated end portion of the of the outer wall of a pipe is secured with a bonding agent to a mating portion of a fitting to provide said joint, the improvement which comprises: molding and bonding from a bonding agent a male thread onto the outer wall of said pipe at a predetermined distance from a terminal end of said pipe, the length of said pipe between said male thread and said terminal end being at least as long as said end portion and including said end portion; molding and bonding from said bonding agent on to said fitting a mating thread with an internal configuration adapted to receive said end portion of said pipe in a substantially mating relationship when the threads of said pipe and said fitting are engaged; applying said bonding agent to at least the length of pipe between the terminal end and thread, screwing the threads of said pipe and said fitting together until said end portion of said pipe and said fitting are held in mating relationship by said threads; and maintaining said relationship until said bonding agent secures said end portion of said pipe to the mating portion of said fitting, said threads and bonding agent being the sole means for holding said pipe within said fitting.

2. The process according to claim 1 wherein said fitting is a bell attached to a length of pipe, said joint being a bell and spigot joint.

3. The method according to claim 1 wherein said pipe is a thin wall plastic pipe.

4. The method according to claim 3 wherein said end portion of said pipe is abraded prior to application of said bonding agent.

5. The method according to claim 3 wherein the end portion of said pipe is tapered.

6. The process according to claim 3 wherein said bonding agent is a curable resinous material.

7. The method according to claim 1 wherein said male thread is molded on said pipe by providing a cap having a closed end, an open end and an internal wall configuration which substantially mates the external shape of said pipe in which a female thread is formed at said predetermined distance from said closed end; applying an amount of a hardenable material to said cap which is sufficient to fill said female thread, said hardenable material being selectively adhesive to the surface of said pipe when hardened; inserting the end of said pipe into the open end of said cap and positioning said cap so that the terminal end of said pipe is immediately adjacent said closed end of said cap, maintaining said cap in this position until said hardenable material hardens, whereby said male thread is molded onto the surface of said pipe at said predetermined distance from the terminal end of said pipe.

8. A pipe joint comprising in combination: a pipe and a fitting, said pipe being positioned within said fitting in mating relationship, and having a thread molded and bonded onto the outer wall thereof at a predetermined length from a terminal end of said pipe, an elongated end portion of said outer wall which is adjacent said terminal end and forward of said thread being bonded to a mating portion of said fitting by a bonding agent extending at least the length of the pipe between the terminal end of the pipe and the thread, said thread on said pipe being threadably engaged with a mating thread of said fitting, said threads and bonding agent being the sole means for holding said pipe within said fitting.

9. The method according to claim 7 wherein said cap remains on said end of said pipe until immediately before said joint is assembled, said cap being secured to said pipe by said male thread, whereby said cap protects the male thread and end of said pipe from damage during shipment and handling prior to assembly of said joint.

10. The method of molding a male thread onto the outer wall of a pipe comprising in combination: providing an annular mold means having an internal wall which substantially mates the outer wall of said pipe and having formed therein a female thread at a predetermined distance from the end of the mold; filling said female thread with a bondable and hardenable material which when hardened is selectively adhesive to said outer wall of said pipe; inserting said pipe into said mold; allowing said material to harden while said mold is in place on said pipe, whereby said male thread is molded and bonded onto said outer wall at a corresponding predetermined distance from the end of the pipe and is releasable from the mold.

11. A pipe-end-protecting device and thread former for protecting the end of a pipe against damage in handling and transportation and for forming threads on said pipe, said device having threads formed thereon at a predetermined distance from the protecting end thereof, a bonding and hardenable material positioned within and substantially filling the space between said threads, said hardenable material being releasable from said threads when hardened to form and bond mating threads to the surface of the pipe at a corresponding predetermined distance from the end of the pipe.

12. A device in accordance with claim 11 which is in the form of a cap, threads formed in the interior of said cap, which cap when placed on a pipe to cover the end thereof, forms mating threads bonded to the outer surface of the pipe on release of the hardened material from the first-mentioned threads.

13. A device in accordance with claim 11 in the form of a plug, threads formed on the plug, which plug when inserted in the pipe forms mating threads bonded to the interior surface of the pipe on release of the hardenable material from the first-mentioned threads.